Patented Sept. 5, 1950 2,521,124

UNITED STATES PATENT OFFICE 2,521,124

INFRARED STRONTIUM SULFIDE PHOSPHORS

Neville F. Miller, Palmerton, Pa., assignor, by mesne assignments, to the United States of America as represented by the Secretary of the Navy No Drawing. Application August 9, 1946, Serial No. 689,511

3 Claims. (Cl. 252—301.4)

This invention relates to a method of preparing strontium sulphide, infrared sensitive, phosphor compositions. In particular it relates to a method of increasing the friability of such phosphor compositions whereby the latter is produced as a rather weakly cemented mass and is capable of reduction to a fine powder by light grinding without loss of sensitivity to infrared stimulation.

Present-day formulas for strontium sulphide, infrared sensitive phosphors call for the use of $SrCO_3$ and S to partially convert to SrS. The flux used in these phosphors is 6% by weight $CaF$ or 6% LiF and they are muffled at 1000–1010° C. The products thus obtained are highly cemented by the muffling and are reduced with difficulty to fine powders. In grinding to a powder there is a large loss in infrared sensitivity which can be restored by remuffling. However, on remuffling recementation occurs.

With this defect and difficulty in view it is therefore one object of this invention to provide a strontium sulphide phosphor composition which can be reduced to a fine powder by light grinding without loss of infrared sensitivity.

It is also an object of this invention to provide a strontium sulphide phosphor composition which is more refractory than that of the type of phosphor above described and which can be rendered luminescent by a single muffling operation.

It is a further object of this invention to provide a method of making the above described phosphors at a greatly reduced cost.

These objectives are attained by this inventor by the use of a reduced amount of flux (1 to 2 per cent LiF or $Li_2CO_3$ with from 1 to 2 per cent $CaHPO_4$) and from 6 to 13 per cent of magnesia as an antiflux. LiF, $CaHPO_4$ combinations give highest sensitivity with SmEu activators. The $CaHPO_4$ enables the development of full sensitivity in one muffling operation. If LiF is used alone, two mufflings are required.

SmCe activated phosphors are harmed more by grinding than SmEu phosphors. For this reason $Li_2CO_3$ is substituted for LiF in SmCe phosphors. The muffled product thus obtained is slightly less sensitive than when LiF is used but the friability is increased so that after grinding the residual sensitivity is greater in phosphors fluxed with $Li_2CO_3$—$CaHPO_4$ than in phosphors fluxed with LiF—$CaHPO_4$.

Formulae suitable for preparing sensitive and friable phosphors with SmEu activators are shown in Table 1. Table 2 gives the formula for a sensitive and friable SmCe activated phosphor. Phosphors prepared according to these formulae may be easily reduced to pass 200-mesh screens without noticeable loss in sensitivity.

Table 1.—Formulation [1] of friable and sensitive Sm-Eu activated phosphors

| Phosphor No. | 1020 | 1043 | 1046 | 1069–1070 | 992–993 | Final Formula |
|---|---|---|---|---|---|---|
| $SrCO_3$ | 5.0 | 5.0 | 5.0 | 5.0 | 5.0 | 5.0 |
| SrS | 4.1 | 4.1 | 4.1 | 4.1 | 4.1 | 4.2 |
| MgO | 1.0 | 1.0 | 1.0 | 0.6 | 1.0 | [2] 1.3 |
| $SmCl_3.6H_2O$ | 0.0046 | 0.0046 | 0.0046 | 0.0046 | 0.0046 | 0.0046 |
| Eu Oxalate. $3H_2O$ | 0.0046 | 0.0046 | 0.0046 | 0.0046 | 0.0046 | 0.0046 |
| S | | 2.6 | 2.6 | | 2.6 | 1.3 |
| LiF | 0.16 | 0.16 | 0.08 | 0.16 | 0.16 | 0.10 |
| $CaHPO_4$ | | 0.16 | 0.16 | | | 0.10 |
| First Muffling: | | | | | | |
| Time, Min. | 25 | 25 | 25 | 25 | 25 | 25 |
| Temp., —°C | 940 | 1,000 | 1,000 | 1,000 | 990 | 1,000 |
| Second Muffling: | | | | | | |
| Time, Min. | 25 | None | None | 25 | None | None |
| Temp., —°C | 915 | | | 1,101 | | |

[1] Weights given in grams.
[2] $MgCO_3$.

Table 2.—Formula [1] for friable and sensitive Sm-Ce activated phosphor

Phosphor L–1138:
  Cerium oxide [2] _____ 0.0050
  $SmCl_2.6H_2O$ _____ 0.00050
  $Li_2CO_3$ _____ 0.10
  $CaHPO_4$ _____ 0.10
  $SrCO_3$ _____ 2.5
  SrS _____ 6.3
  $MgCO_3$ _____ 1.3
  Sulfur _____ 2.0

One muffling—25 minutes at 1000° C.

[1] Weight in grams.
[2] The cerium oxide is an oxidation product of cerium metal and is probably $Ce_2O_3$. The 0.0050 gram of cerium oxide can be replaced with 0.016 gram ammonium tetrasulfato cerate without changing the infrared sensitivity.

In the preparation of the mixtures the activators and fluxes (LiF and $CaHPO_4$) are ground together with alcohol, then the $SrCO_3$ and SrS are ground in, then the magnesia. After drying at 100° C. to remove the alcohol the sulphur is ground in.

The above compositional formulae are given merely for the purposes of illustration and to set forth the method of application of this inventor's invention. The compositions given, other than that of the anti-flux MgO (or $MgCO_3$) and the reduced percentages of the fluxes LiF and $CaHPO_4$, form no part of this invention. The latter resides in the use of these excepted components and in the fact that by the use of these components, in the approximate amounts given, an infrared sensitive phosphor composition is produced which is friable and readily reduced to a fine powder without loss of sensitivity—in a single muffling operation.

While specific percentages of these components have been given it is not desired to be strictly limited thereto as slight variations can be made therefrom without affecting the characteristics of the final product and without departing from the scope of the invention as defined by the herewith appended claims.

I claim:

1. An infrared sensitive phosphor composition characterized by friability and easy reduction to powdered form without substantial loss of sensitivity, obtained by firing a mixture consisting essentially of strontium sulfide and strontium carbonate in the ratio of from about 2.5 to 4 parts by weight of strontium sulfide to from about 1 to 5 parts by weight of strontium carbonate, said mixture being activated by samarium and an auxiliary activator selected from the group consisting of europium and cerium, and containing 1 to 2% $CaHPO_4$ and 1 to 2% of a lithium salt selected from the group consisting of lithium fluoride and lithium carbonate as flux, and 6 to 13% antiflux selected from the group consisting of magnesia and magnesium carbonate.

2. An infrared sensitive phosphor composition characterized by friability and easy reduction to powdered form without substantial loss of sensitivity, obtained by firing a mixture consisting essentially of strontium sulfide and strontium carbonate in the ratio of from about 2.5 to 4 parts by weight of strontium sulfide to from about 1 to 5 parts by weight of strontium carbonate, said mixture being activated by samarium and an auxiliary activator consisting of europium, and containing 1 to 2% $CaHPO_4$ and 1 to 2% lithium fluoride as a flux, and 6 to 13% antiflux selected from the group consisting of magnesia and magnesium carbonate.

3. An infrared sensitive phosphor composition characterized by friability and easy reduction to powdered form without substantially loss of sensitivity, obtained by firing a mixture consisting essentially of strontium sulfide and strontium carbonate in the ratio of from about 2.5 to 4 parts by weight of strontium sulfide to from about 1 to 5 parts by weight of strontium carbonate, said mixture being activated by samarium and an auxiliary activator consisting of cerium, and containing 1 to 2% $CaHPO_4$ and 1 to 2% lithium carbonate as a flux, and 6 to 13% antiflux selected from the group consisting of magnesia and magnesium carbonate.

NEVILLE F. MILLER.

REFERENCES CITED

The following references are of record in the file of this patent:

UNITED STATES PATENTS

| Number | Name | Date |
|---|---|---|
| 2,131,557 | Goggin | Sept. 27, 1938 |
| 2,372,071 | Fernberger | Mar. 20, 1945 |

FOREIGN PATENTS

| Number | Country | Date |
|---|---|---|
| 492,735 | Great Britain | Dec. 19, 1936 |

OTHER REFERENCES

Cathodoluminescence by Nichols, Howes and Wilbur, p. 46.

Fluorochemistry by De Ment, p. 362.

Journal of Optical Society of America, July 1946, pp. 369–371; pp. 372–381.